US007274397B2

(12) United States Patent
Fowler

(10) Patent No.: US 7,274,397 B2
(45) Date of Patent: Sep. 25, 2007

(54) IMAGE SENSOR WITH ACTIVE RESET AND RANDOMLY ADDRESSABLE PIXELS

(75) Inventor: Boyd Fowler, Sunnyval, CA (US)

(73) Assignee: Micron Technology, Inc., Boise, ID (US)

( * ) Notice: Subject to any disclaimer, the term of this patent is extended or adjusted under 35 U.S.C. 154(b) by 800 days.

(21) Appl. No.: 10/639,227

(22) Filed: Aug. 11, 2003

(65) Prior Publication Data

US 2005/0036048 A1    Feb. 17, 2005

(51) Int. Cl.
   *H01L 27/00*    (2006.01)
(52) U.S. Cl. .................... 348/308; 250/208.1
(58) Field of Classification Search ............... 348/302, 348/308, 294, 309; 250/208.1; 257/291
   See application file for complete search history.

(56) References Cited

U.S. PATENT DOCUMENTS

| 6,469,740 | B1* | 10/2002 | Kuroda et al. ............. 348/308 |
| 6,587,142 | B1* | 7/2003 | Kozlowski et al. ......... 348/241 |
| 6,777,660 | B1* | 8/2004 | Lee ........................ 250/208.1 |
| 7,019,345 | B2* | 3/2006 | Pain et al. ................. 257/292 |
| 2002/0050940 | A1* | 5/2002 | Sato et al. ................. 341/155 |
| 2003/0146993 | A1* | 8/2003 | Kokubun et al. .......... 348/308 |
| 2004/0196397 | A1* | 10/2004 | Beck et al. ................ 348/308 |
| 2004/0201761 | A1* | 10/2004 | Mentzer ..................... 348/308 |
| 2004/0227828 | A1* | 11/2004 | Loose ........................ 348/294 |
| 2004/0227832 | A1* | 11/2004 | Loose ........................ 348/308 |
| 2006/0175534 | A1* | 8/2006 | Barna et al. ............. 250/208.1 |
| 2006/0244854 | A1* | 11/2006 | Krymski .................... 348/308 |

* cited by examiner

*Primary Examiner*—Ngoc-Yen Vu
*Assistant Examiner*—John Morehead
(74) *Attorney, Agent, or Firm*—RatnerPrestia

(57) ABSTRACT

An imaging array having one or more columns of pixels is disclosed. Each pixel includes a photodiode including first and second terminals, a local reset circuit for connecting the first terminal to a column reset line; and a buffer circuit for selectively connecting the first terminal to a column bit line in response to a word select signal. Each column also includes a column reset circuit having an operational amplifier and a low-pass filter. The operational amplifier has a first input connected to the column bit line for that column and a second input connected to a reset signal generator that generates a reset signal during a reset cycle. The output of the operational amplifier is connected to the column reset line during the reset cycle. In one embodiment, the gain of the operational amplifier and the passband of the low-pass filter are varied during the reset cycle.

10 Claims, 2 Drawing Sheets

IMAGE SENSOR WITH ACTIVE RESET AND RANDOMLY ADDRESSABLE PIXELS

FIELD OF THE INVENTION

The present invention relates to CMOS image sensors.

BACKGROUND OF THE INVENTION

In principle, CMOS image sensors provide a number of advantages over CCD image sensors. The CMOS yields are significantly better than those of the CCD fabrication process. In addition, the minimum noise levels achievable with CMOS-based sensors are substantially lower than those that can be obtained with CCDs. Finally, the image stored in a CMOS-based image sensor can be readout without destroying the image.

CMOS sensors suffer from temporal noise. Schemes for reducing temporal noise are known to the art. For example, U.S. Pat. No. 6,424,375, which is hereby incorporated by reference, describes an active pixel reset system that reduces the effects of temporal noise. However, the pixel design discussed in this patent requires a CMOS pixel having a number of additional components that are used to reset the voltage on a photodiode prior to accumulating an image. This additional circuitry increases the size of the pixel, and hence, increases the cost of an imaging array utilizing this design.

In addition, there is a tradeoff between the degree of noise reduction and the time needed to reset the pixel. To provide high noise reduction, the bandwidth of the reset circuit must be limited. This increases the time needed for the photodiode to stabilize at the reset potential. If the bandwidth is increased to provide a shorter reset time, the noise level increases. Hence, this design cannot provide both short reset times and high noise reduction.

SUMMARY OF THE INVENTION

The present invention includes an imaging array having one or more columns of pixels. Each pixel includes a photodiode including first and second terminals, a local reset circuit for connecting the first terminal to a column reset line; and a buffer circuit for selectively connecting the first terminal to a column bit line in response to a word select signal. Each column also includes a column reset circuit having an operational amplifier and a low-pass filter. The operational amplifier has a first input connected to the column bit line for that column and a second input connected to a reset signal generator that generates a reset signal during a reset cycle. The output of the operational amplifier is connected to the column reset line during the reset cycle. In one embodiment, the operational amplifier has a gain that is determined by a gain control signal. The gain of the operational amplifier is varied during the reset cycle in this embodiment. In this embodiment, the passband of the low-pass filter is also varied over the reset cycle. The preferred low-pass filter includes one or more capacitors that are connected to the column reset line during the reset cycle.

DETAILED DESCRIPTION OF THE PREFERRED EMBODIMENTS OF THE INVENTION

Figure 1:
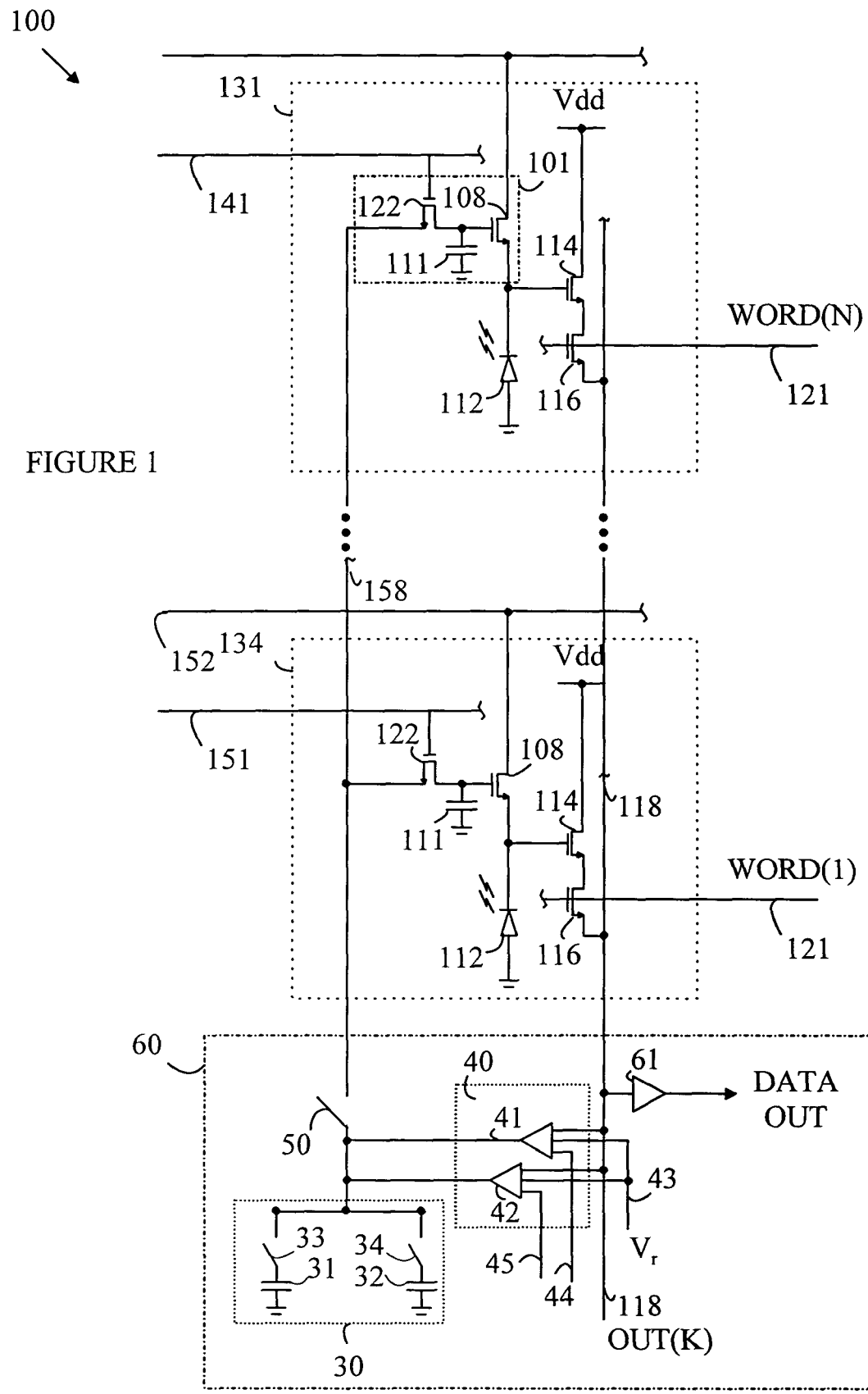
FIG. 1 is a schematic drawing of one column 100 of pixels in a two-dimensional imaging array.

The manner in which the present invention provides its advantages can be more easily understood with reference to FIG. 1. FIG. 1 is a schematic drawing of one column 100 of pixels in a two-dimensional imaging array.

Referring to FIG. 1, an imaging array according to one embodiment of the present invention is constructed from a plurality of pixels that are organized into a rectangular array having M columns and N rows. FIG. 1 shows one column of pixels. Exemplary pixels are shown at 131 and 134. Each pixel has three components, a photodiode 112, a local reset circuit 101, and an output amplifier. The output amplifier consists of transistors 114 and 116. Transistor 116 is used to selectively couple the output from transistor 114 to a column output line 118 that is used to couple a signal representing the potential on photodiode 112 to a column output amplifier 61. The selected pixel is connected to output line 118 by a signal on the corresponding word line 121.

The local reset circuit 101 consists of transistors 122 and 108 and capacitor 111. While capacitor 111 is shown as a separate circuit component, it should be noted that capacitor 111 can be replaced by the parasitic capacitance of transistor 122 in some embodiments. Transistor 122 couples the gate of transistor 108 to a column reset line 158 in response to a signal on the corresponding reset line. Exemplary word reset lines are shown at 141 and 151. At any given time, only one pixel in each column is coupled to column reset line 158.

Each column of pixels also includes a column reset circuit 60 that includes an amplifier 40 and a capacitor 30. In the embodiment of the present invention shown in FIG. 1, amplifier 40 includes a plurality of operational amplifiers connected in parallel. Exemplary amplifiers are shown at 41 and 42. Each amplifier includes a gating circuit that determines if the amplifier is ON or OFF. The gating circuits for amplifiers 41 and 42 are controlled by suitable signals on control lines 44 and 45, respectively. Likewise, in this embodiment, capacitor 30 is constructed from a plurality of capacitors connected in parallel. Exemplary capacitors are shown at 31 and 32. Each capacitor has a corresponding switch that determines whether or not the capacitor is connected to column reset line 158. The switches corresponding to capacitors 31 and 32 are shown at 33 and 34, respectively.

To better understand the basic reset cycle, assume that only one of the component amplifiers and capacitors is connected to column reset line 158, e.g., amplifier 41 and capacitor 31. Assume that pixel 134 is to be reset. The reset cycle can be broken into two time periods. At the start of the reset cycle, column reset line 158 is connected to the reset amplifier by closing switch 50. In addition, reset line 151 is raised to connect the gate of transistor 108 to reset line 158, and transistor 108 is connected to Vdd via reset line 152. The output of amplifier 41 is then briefly grounded. Amplifier 41 is then connected to a reset signal generator via lead 43. During the first time period the negative input of the operational amplifier, Vr, is increased linearly to a maximum potential. When Vr exceeds the potential on photodiode 112 plus the threshold voltages of transistors 108 and 114, the potential on the photodiode likewise increases to some maximum value. During the second time period, Vr is held constant at its maximum value. The potential on photodiode 112 increases during this period of time due to transistor 108. This causes the output of amplifier 41, which is connected to the reset line 158, to fall until its differential inputs are at approximately the same potential. The drop in potential on reset line 158 turns off transistor 108 and the potential on photodiode 112 is then allowed to settle during the second period of time. During this second time period, the photodiode is capacitive coupled to reset line 158 via the gate to source capacitance of transistor 108. The capacitive coupling to photodiode 112 forms a feedback loop around amplifier 41. This feedback loop is used to reduce the reset noise on the photodiode 112. The settling of the feedback loop follows a typical RC time curve, hence, the larger the capacitance, the longer the settling time.

The noise level, i.e., the variations in the reset potential on the photodiode, also depends on the value of capacitor 31. It can be shown that the noise in the reset value is approximately given by:

$$\text{Noise} = kTC/(1+A\beta)^2 + f(\text{bandwidth}),$$

where kT is Boltzmann's constant times absolute temperature, C is the capacitance of the photodiode 112, A is the amplification factor of amplifier 41, $\beta$ is the feedback loop gain, and f is a function of the bandwidth of the reset loop that increases with increasing bandwidth. Hence, to provide the lowest noise, one wishes to maximize the amplification factor while minimizing the bandwidth of the reset loop. The bandwidth of the reset loop is controlled by the capacitance of capacitor 31 in this example. The larger the output capacitance of amplifier 40, the smaller the amplifier bandwidth. In addition, a small bandwidth must be used if a large amplification factor is utilized to minimize the noise arising from the first term in the above equation. Unfortunately, as noted above, the time needed for the photodiode to settle to the reset potential is also determined by the bandwidth of the reset loop, smaller bandwidths lead to increased settling times. Hence, a single amplifier and capacitance value cannot provide both low noise and fast reset times.

In one preferred embodiment of the invention, this problem is overcome by using an amplifier having an amplification factor that varies in time over the reset cycle. Similarly, the bandwidth limiting capacitance is also varied over time. In the beginning of the reset cycle, a small amplification factor and large bandwidth are utilized to move the potential on photodiode 112 to a value close to the desired reset potential. Once the reset potential is close to its final value, a larger amplification factor and a smaller bandwidth are utilized to reduce the noise level. Since the reset potential is near its final value when the switch occurs, the settling time is not increased significantly, since the voltage change that must be accommodated at the reduced bandwidth is relatively small.

In this embodiment, the change in amplification and bandwidth limiting capacitance is implemented by switching the selected amplifier and capacitor. As noted above, amplifier 40 includes a plurality of operational amplifiers. Each operational amplifier has a different gain in this embodiment of the present invention. Hence, by switching the selected amplifier during the reset cycle, the amplification factor can be effectively varied. Similarly, capacitor 30 is implemented as a plurality of capacitors that can be switched into, or out of, the reset loop at predetermined points in the reset cycle.

Figure 2:
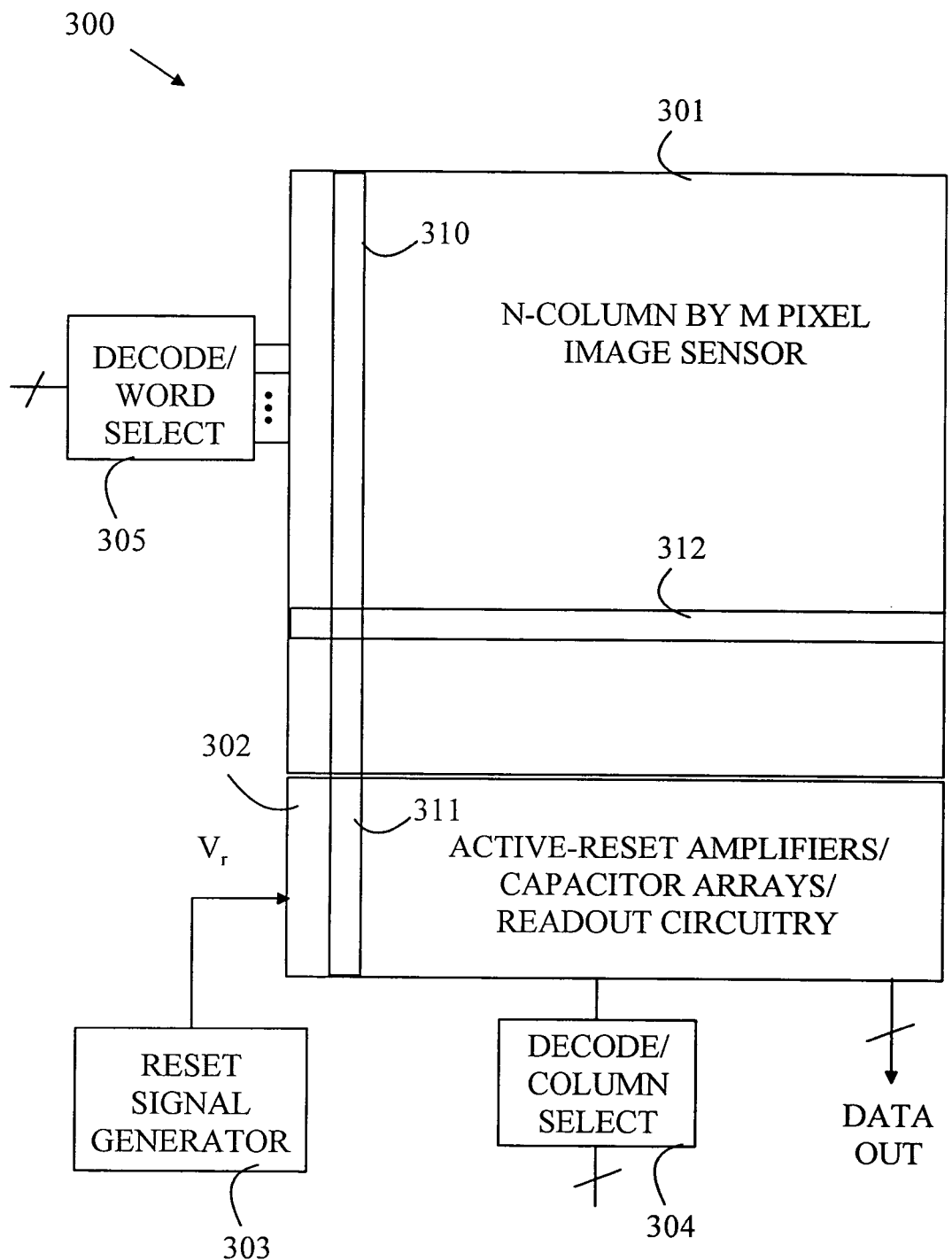
FIG. 2 is a block diagram of a two-dimensional imaging array 300 together with the reset and decode circuitry used to run the pixels of the imaging array.

Refer now to FIG. 2, which is a block diagram of a two-dimensional imaging array 300 together with the reset and decode circuitry used to run the pixels of the imaging array. Imaging array 300 is constructed from a plurality of columns of pixels constructed as discussed above with reference to FIG. 1. The pixels are organized into a rectangular array 301 having N columns and M rows. All of the pixels on a given row are connected to the same word line and word reset line. Each column of pixels has one reset circuit such as that discussed with reference to FIG. 1. The N column reset circuits are shown at 302. An exemplary column of pixels is shown at 310, and the corresponding column reset circuit is shown at 311. An exemplary row is shown at 312. A single reset signal generator 303 provides the reset signal for all of the columns.

All of the pixels in a row can be read and reset in parallel. The row in question is determined by an address that is input to word decode circuit 305. When a row is selected for reading, N analog signals are available for reading, one from each column. If a single pixel value is to be output, a column decode circuit 304 can be utilized to select the desired column. In one preferred embodiment of the invention, the readout circuitry includes an analog-to-digital converter (ADC) that converts the analog value to a digital value that is output from the imaging array. However, embodiments that output the analog voltage that is converted off of the imaging array can also be practiced.

Alternatively, the readout circuit can include one ADC per column. In this case, the ADC latches preferably store the converted results. The results can then be readout in an order specified by column select circuit 304.

It should be noted that the present invention is well suited for applications in which only a subset of all of the pixels in the array are utilized. For example, in automated digital cameras, the camera sets the focus and exposure by examining a subset of the pixels in an image. The focus is typically set with reference to one of a predetermined plurality of sub-fields in the field of view. The exposure is typically set by measuring the light intensity of a predetermined plurality of pixels that are more or less randomly placed in the field of view.

The present invention allows all or a subset of the pixels in each row to be readout. Similarly, any subset of the pixels in any given row can be reset. Hence, when a sequence of measurement that involves only a subset of the total pixels is needed, only those pixels need to be read and reset. Since reading and resetting the entire image can require a significant amount of time, this random access feature can significantly shorten the time needed to compute the correct exposure and focus.

In addition, the power consumed in such partial readout and reset operations is substantially less than that utilized in systems in which all of the image must be read and reset. Digital cameras are generally powered by batteries. Hence, the present invention provides a means for increasing the number of images that can be taken before the battery needs to be replaced.

Various modifications to the present invention will become apparent to those skilled in the art from the foregoing description and accompanying drawings. Accordingly, the present invention is to be limited solely by the scope of the following claims.

What is claimed is:

1. An imaging array comprising:
   a first plurality of pixels, each pixel comprising:
   a photodiode including first and second terminals;
   a local reset circuit for connecting said first terminal to a first column reset line; and
   a buffer circuit for selectively connecting said first terminal to a first column bit line in response to a word select signal; and
   a first column reset circuit comprising an operational amplifier and a low-pass filter, said operational amplifier having a first input connected to said first column bit line, a said second input connected to a reset signal generator that generates a reset signal during a reset cycle, and an output selectively connected to said first column reset line.

2. The imaging array of claim 1 wherein said operational amplifier has a gain that is determined by a gain control signal.

3. The imaging array of claim 2 wherein said operational amplifier comprises a plurality of component operational amplifiers Connected in parallel, each component operational amplifier having a different gain, each component operational amplifier being selectable by said gain control signal.

4. The imaging array of claim 2 wherein said gain of said operational amplifier is varied during said reset cycle.

5. The imaging array of claim 1 wherein said low-pass filter has a passband that is determined by a low-pass filter control signal.

6. The imaging array of claim 5 wherein said passband of said low-pass filter is varied during said reset cycle.

7. The imaging array of claim 6 wherein said low-pass filter comprising a capacitor that is connected to said first column reset line during said reset cycle.

8. The imaging array of claim 1 further comprising:

a second plurality of pixels, each pixel comprising:

a photodiode including first and second terminals;

a local reset circuit for connecting said first terminal to a second column reset line; and a buffer circuit for selectively connecting said second terminal to a second column bit line in response to a word select signal; and a second column reset circuit comprising an operational amplifier and a low-pass filter, said operational amplifier having a first input connected to said second column bit line, said second input connected to said reset signal, and an output selectively connected to said second column reset line.

9. The imaging array of claim 1 wherein the first column reset line and the first column bit line are selectively coupled together by the operational amplifier.

10. The imaging array of claim 8 wherein the second column reset line and the second column bit line are selectively coupled together by the operational amplifier.

\* \* \* \* \*

UNITED STATES PATENT AND TRADEMARK OFFICE
CERTIFICATE OF CORRECTION

PATENT NO. : 7,274,397 B2  Page 1 of 1
APPLICATION NO. : 10/639227
DATED : September 25, 2007
INVENTOR(S) : Fowler It is certified that error appears in the above-identified patent and that said Letters Patent is hereby corrected as shown below:

In column 5, line 2, in Claim 1, after "bit line, a" delete "said".

In column 5, line 11, in Claim 3, delete "Connected" and insert -- connected --, therefor.

Signed and Sealed this

Twenty-seventh Day of November, 2007

JON W. DUDAS
*Director of the United States Patent and Trademark Office*